US008665320B2

(12) United States Patent
Holley (10) Patent No.: US 8,665,320 B2
(45) Date of Patent: Mar. 4, 2014

(54) METHOD AND APPARATUS FOR AUTOMATIC SYNCHRONIZATION OF AUDIO AND VIDEO SIGNALS

(75) Inventor: Eric Holley, Atlanta, GA (US)

(73) Assignee: Echo Star Technologies L.L.C., Englewood, CO (US)

( * ) Notice: Subject to any disclaimer, the term of this patent is extended or adjusted under 35 U.S.C. 154(b) by 393 days.

(21) Appl. No.: 12/843,370

(22) Filed: Jul. 26, 2010

(65) Prior Publication Data
US 2012/0019633 A1 Jan. 26, 2012

(51) Int. Cl.
*H04N 9/47* (2006.01)

(52) U.S. Cl.
USPC ............................................. 348/53

(58) Field of Classification Search
USPC .................................. 348/41–161
See application file for complete search history.

(56) References Cited

U.S. PATENT DOCUMENTS

| 7,499,822 B2* | 3/2009 | Montreuil et al. ............ 702/117 |
| 7,961,780 B2* | 6/2011 | Montreuil et al. ............ 375/228 |
| 7,996,750 B2* | 8/2011 | Wang et al. .................. 714/798 |
| 2002/0140857 A1* | 10/2002 | Limaye ........................ 348/515 |
| 2005/0238320 A1* | 10/2005 | Shultz ............................. 386/46 |
| 2006/0161835 A1* | 7/2006 | Panabaker et al. ......... 715/500.1 |
| 2007/0091207 A1* | 4/2007 | Aufranc et al. ............... 348/462 |
| 2008/0022338 A1* | 1/2008 | Montreuil et al. ............ 725/107 |
| 2011/0275320 A1* | 11/2011 | Pattenden .................... 455/41.2 |

FOREIGN PATENT DOCUMENTS

| EP | 1 758 387 A1 | 2/2007 |
| WO | 2006/064477 A2 | 6/2006 |

OTHER PUBLICATIONS

International Search Report and Written Opinion of PCT/US2011/045381 mailed Dec. 1, 2011, 9 pages.

\* cited by examiner

*Primary Examiner* — Joseph Ustaris
*Assistant Examiner* — Talha Nawaz
(74) *Attorney, Agent, or Firm* — Kilpatrick Townsend & Stockton LLP (57) ABSTRACT

Described herein are techniques which facilitate the automatic synchronization of audio and video signals between an entertainment device and a presentation device. A sensing device detects and records timing information from a video test pattern generated by an entertainment device and output by a presentation device. Using the timing information from the sensing device, the entertainment device synchronizes the audio and video signals it outputs to one or more presentation devices. The presentation device exhibits synchronized audio and video to a user.

11 Claims, 6 Drawing Sheets

METHOD AND APPARATUS FOR AUTOMATIC SYNCHRONIZATION OF AUDIO AND VIDEO SIGNALS

BACKGROUND

Modern televisions have complex video processing circuits that often introduce a delay between the time the video signal enters the TV and the time the video is displayed. Many home entertainment systems have separate audio and video presentation devices connected to a single entertainment device. For instance, home theaters often have surround sound speakers and a high definition TV separately connected to a single receiver or single video game system. The delay caused by modern televisions can create issues with audio/video (A/V) synchronization, resulting in the video output "lagging" behind the audio output. Such audio or video lag causes confusion and frustration among TV viewers and disrupts video game players. The synchronization dilemma is especially problematic when a video game console or set-top box transmits video game or 3-D content to a television. When a set-top box is supplying the 3-D content and driving associated 3-D active shutter glasses, extremely precise synchronization between the set-top box, 3-D glasses, and 3-D TV is required to produce the correct 3-D effect.

Although some solutions have been offered to fix the synchronization problem, most require the user to manually configure and adjust the A/V synchronization settings. For example, past solutions involved adjusting a dial or pressing a button in sync with a video display so as to fix the audio or video lag. Solutions reliant upon user input are time consuming, inaccurate, and prone to user-error. Furthermore, manual synchronization of 3-D video is inadequate to provide the requisite level of synchronization between set-top box, 3-D TV, and 3-D glasses. Therefore, an automatic, more precise synchronization method is desirable.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the synchronization of audio and video signals between an entertainment device and a presentation device. More particularly, the various embodiments described herein provide apparatus, systems, and methods which automatically synchronize audio and video signals by utilizing a video test pattern and sensing device. The sensing device detects and records timing information based on the video test pattern output by the presentation device. Using this timing information, the entertainment device synchronizes the audio and video signal output to one or more presentation devices. The presentation devices exhibit synchronized audio and video to a user.

In at least one embodiment described herein, an entertainment device generates a video test pattern and outputs the test pattern to a presentation device. The video test pattern is displayed by the presentation device and sensed by a sensing device. The sensing device uses the test pattern to determine timing information and transmits the information to the entertainment device. Subsequently, the entertainment device processes the timing information to derive a delay constant. The delay constant is used to synchronize the audio and video signals output by the entertainment device to the presentation device. The entertainment device may also use the delay constant to synchronize the operation of 3-D glasses with 3-D content output by the entertainment device to the presentation device. The presentation device outputs the synchronized audio and video signals to the user.

In another embodiment described herein, the video test pattern comprises alternating colored screens (e.g., a black screen followed by a red screen) and the sensing device includes a light sensor and color filter adjusted to a specific color (e.g., red). The light sensor with color filter perceives the specific color filtered by the color filter and records the time at which that color appears on the video display of the presentation device. The sensing device includes a communication interface that is communicatively coupled to the entertainment device. The sensing device also includes control logic programmed to analyze the captured test pattern timing information and transmit the information to the entertainment device. The time at which the specific color is displayed by the video test pattern is known to the control logic of the entertainment device. The entertainment device uses the timing information transmitted to it by the sensing device to determine the delay of video output caused by the presentation device. The entertainment device uses this delay information to determine a delay constant, and uses the delay constant to synchronize its output of audio and video signals so that they are synchronously output by one or more presentation devices. The entertainment device may also use this delay constant to synchronize the operation of 3-D glasses with its output of audio and video signals, so that the one or more presentation devices correctly display the 3-D content.

Another embodiment described herein provides an entertainment device operable to transmit audio and video data to a presentation device and receive timing information used to synchronize audio and video output. The entertainment device includes an output interface communicatively coupled to a presentation device and an input interface communicatively coupled to a sensing device. The entertainment device also includes control logic configured to use timing information to generate a delay constant and utilize the delay constant to synchronize audio and video signals for presentation by the presentation device. The delay constant may also be used by the entertainment device to synchronize the operation of 3-D glasses with its output of 3-D content, ensuring that the 3-D content is correctly perceived by the user.

Figure 1:
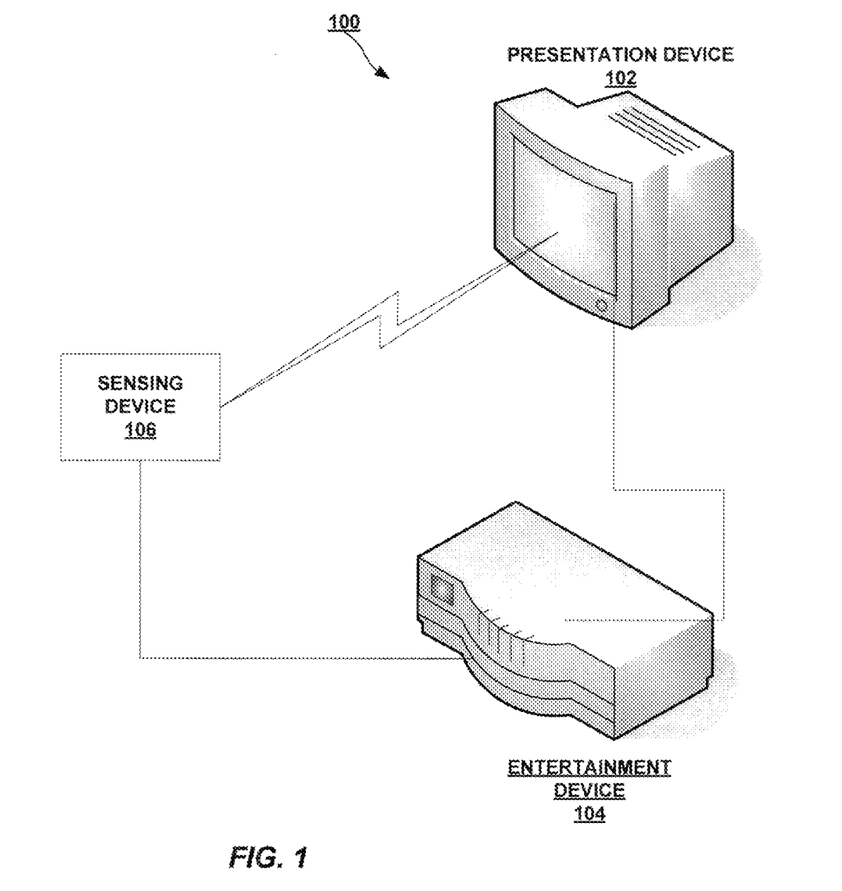
FIG. 1 illustrates an embodiment of an entertainment system.

FIG. 1 illustrates an embodiment of an entertainment system 100. The entertainment system 100 includes a presentation device 102, an entertainment device 104, and a sensing device 106. Each of these components is discussed in greater detail below. The entertainment system 100 may include other components, elements, or devices not illustrated for the sake of brevity.

The presentation device 102 may comprise any type of device capable of receiving and outputting video and audio signals in any format. Exemplary embodiments of the presentation device 102 include a television, a computer monitor, a 3-D television, a liquid crystal display (LCD) screen, a touch screen and a projector. The presentation device 102 and the entertainment device 104 may be communicatively coupled through any type of wired or wireless interface. For example, the presentation device 102 may be communicatively coupled to the entertainment device 104 through a coaxial cable, component or composite video cables, an HDMI cable, a VGA or SVGA cable, a Bluetooth or WiFi wireless connection or the like. In at least one embodiment, the presentation device 102 consists of separate elements (e.g., a computer monitor and speakers, a home entertainment system, a 3-D TV with 3-D active shutter glasses, or any other type of media display system that includes separate audio and video output devices) separately connected to the entertainment device 104. In at least one embodiment, the presentation device 102 includes control logic configured to transmit a delay constant to the entertainment device 104. In some embodiments, the presentation device 102 includes a plurality of audio and/or video inputs communicatively coupled to the entertainment device 104, and at least one separate audio or video output device (e.g., a home theater system or video monitor with separate speaker system).

In at least one embodiment, the entertainment device 104 is operable to receive content from one or more content sources (not shown in FIG. 1), and to present the received content to the user via the associated presentation device 102. The entertainment device 104 may receive an audio/video stream in any format (e.g., analog or digital format), and output the audio/video stream for presentation by the presentation device 102. In at least one embodiment, the entertainment device 104 is a set-top box (e.g., a satellite television receiver, cable television receiver, terrestrial television receiver, internet protocol television receiver or any other type of receiver/converter box), digital video recorder (DVR) or other similar device that processes and provides one or more audio and/or video output streams to a presentation device 102 for presentation to the user. In some embodiments, the entertainment device 104 includes control logic configured to receive and record delay constant information from the presentation device 102. In some embodiments, the entertainment device 104 is an optical disk player (e.g., a DVD player), video game system, or other similar device that internally generates and provides audio/video output streams to the presentation device 102.

The entertainment device 104 is communicatively coupled to the sensing device 106, utilizing any type of wired or wireless interface. For example, the entertainment device 104 may be communicatively coupled to the sensing device 106 through a coaxial cable, a USB connection, a Bluetooth or WiFi wireless connection, IR and/or RF link, mobile communication network (e.g., a cellular telephone network) or the like. The entertainment device 104 contains control logic configured to process timing information received from the sensing device 106 and/or the presentation device 102 and identify a delay constant based on the timing information. The delay constant is used by the entertainment device 104 to synchronize the output of audio and video signals to the presentation device 102 in order to ensure that they are perceived as in sync by the user.

The sensing device 106 may comprise any system or apparatus configured to sense light and/or video displayed by a presentation device 102. In at least one embodiment, the sensing device 106 includes a light sensor and color filter operable to detect a specific color contained in a video test pattern generated by the entertainment device 104 and displayed by the presentation device 102. Although the sensing device 106 may be a stand-alone peripheral, it may also be incorporated into many different types of devices. For example, the sensing device 106 may be a remote control configured to control the entertainment device 104 and/or the presentation device 102, a dongle physically connected to the entertainment device 104, and/or a pair of 3-D glasses. In some embodiments, the sensing device 106 is a mobile communication device (e.g., a cellular phone). The sensing device 106 may also comprise a personal digital assistant, tablet computer, laptop computer or the like.

It is to be appreciated that the entertainment device 104 may comprise any type of video gaming system or any other system (e.g., a set-top box or personal computer) that is capable of playing video games. In at least one embodiment, the sensing device 106 comprises a gaming peripheral (e.g., a mouse, gamepad, joystick, motion-sensing controller, light gun or like device). Other embodiments of the entertainment device 104 include gaming peripherals separate from the sensing device that are communicatively coupled to the entertainment device 104 and operable to control video games. The delay constant generated by the entertainment device 104 and sensing device 106 may be utilized by the control logic of the entertainment device 104 to ensure that all interactivity between the gaming peripherals, the video game, and the entertainment device 104 are properly synchronized with the audio and video output as presented by the presentation device 102.

Figure 2:
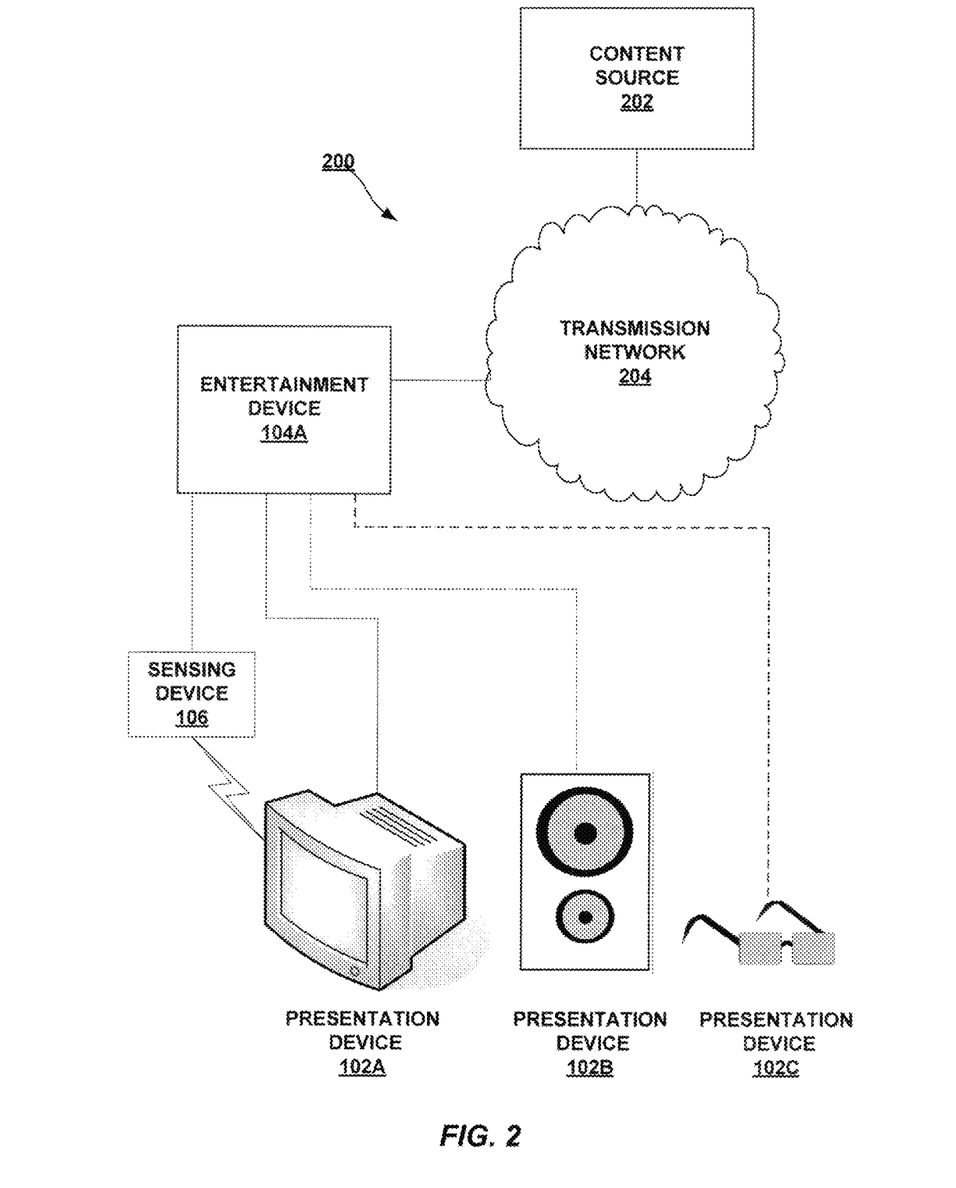
FIG. 2 illustrates an embodiment of a communication system.

FIG. 2 illustrates an embodiment of a communication system 200. FIG. 2 will be discussed in reference to the entertainment system 100 illustrated in FIG. 1. The communication system 200 includes a first presentation device 102A, a second presentation device 102B, a third presentation device 102C, an entertainment device 104A, a sensing device 106, a content source 202, and a transmission network 204. Each of these components is discussed in greater detail below. The communication system 200 may contain other components, elements, or devices not illustrated for the sake of brevity.

The content source 202 is operable for receiving, generating and communicating content to one or more entertainment devices 104A via the transmission network 204. The content to be received, processed, outputted and/or communicated may come in any of various forms including, but not limited to, audio, video, data, information, or otherwise. In at least one embodiment, the content source 202 is operable for receiving various forms and types of content from other sources, aggregating the content and transmitting the content to the entertainment device 104A via the transmission network 204. It is to be appreciated that the content source 202 may receive practically any form and/or type of information from one or more sources including streaming television programming, recorded audio or video, electronic programming guide data, video games, 3-D video and the like. Exemplary content sources 202 include over-the-air (OTA) terrestrial transmission facilities, cable television distribution head-ends, satellite television uplink centers, broadband or internet servers and the like. In various embodiments, the content source 202 may be a device located locally with respect to an entertainment device 104A, such as a digital video recorder (DVR), digital video disk (DVD) player or other optical disk player, a local storage medium and the like.

The transmission network 204 may be embodied as a cable television distribution system, an over-the-air television distribution system, the internet, a satellite communication system, or any similar transmission network. In at least one embodiment, the transmission network is communicatively coupled to the entertainment device 104A, utilizing any type of wired or wireless interface. For example, the transmission network 204 may be communicatively coupled to the entertainment device 104A through a coaxial cable, component or composite video cables, an HDMI cable, a VGA or SVGA cable, USB connection, a Bluetooth or WiFi wireless connection, mobile communication network (e.g., a cellular telephone network) or the like.

The first presentation device 102A may comprise any type of device capable of receiving and outputting video signals in any format. Exemplary embodiments of the presentation device 102A include a television, a computer monitor, a 3-D television, a liquid crystal display (LCD) screen, a touch screen and a projector. The presentation device 102A and the entertainment device 104A may be communicatively coupled through any type of wired or wireless interface. For example, the presentation device 102A may be communicatively coupled to the entertainment device 104A through a coaxial cable, component or composite video cables, an HDMI cable, a VGA or SVGA cable, a Bluetooth or WiFi wireless connection or the like. The first presentation device 102A is operable to receive a video test pattern from the entertainment device 104A and display the test pattern to be sensed by the sensing device 106.

The optional second presentation device 102B may comprise any type of device capable of receiving and outputting audio signals in any format (e.g., speakers of any kind, a surround sound system, Heil air motion transducers or the like). The second presentation device 102B is communicatively coupled to the entertainment device 104A through any type of wired or wireless interface. In at least one embodiment, the second presentation device 102B is communicatively coupled to the first presentation device 102A via any type of wired or wireless interface.

In at least one embodiment, the third presentation device 102C comprises any type of device capable of presenting and/or facilitating the presentation of a stereoscopic or 3-D image to the viewer. Exemplary embodiments of the presentation device 102C include active shutter glasses (e.g., liquid crystal shutter glasses), linearly polarized glasses, circularly polarized glasses, interference filter technology glasses, and anachrome optical diopter glasses. In at least one embodiment, the third presentation device 102C is communicatively coupled to the entertainment device 104A via a wired or wireless interface (e.g., infrared, radio frequency, DLP-Link, or Bluetooth connection). The third presentation device 102C may be operable to send and/or receive a timing signal and/or a delay constant from the entertainment device 104A. The timing signal is utilized by the first presentation device's 102D control logic to alternately darken each lens in synchronization with the refresh rate of the presentation device 102A. In other words, in some embodiments of the communication system 200, the first presentation device 102A (e.g., a 3-D TV), third presentation device 102C (e.g., 3-D active shutter glasses), and entertainment device 104A (e.g., a set-top box outputting 3-D content to a 3-D TV and driving 3-D active shutter glasses) are operable to work together to utilize alternate-frame sequencing to produce a stereoscopic or 3-D image to the viewer.

In at least one embodiment, the entertainment device 104A may be similar to the entertainment device of FIG. 1. Additionally, the entertainment device 104A is operable to receive content from one or more content sources via the transmission network 204 and to present the received content to the user via the first presentation device 102A and/or second presentation device 102B. The entertainment device 104A may receive an audio/video stream in any format (e.g., analog or digital format), and output the audio/video stream for presentation by the presentation devices 102A and 102B. In at least one embodiment, the entertainment device 104A is a set-top box (e.g., a satellite television receiver, cable television receiver, terrestrial television receiver, internet protocol television receiver or any other type of receiver/converter box), digital video recorder (DVR) or other similar device that is operable to process and provide one or more audio and/or video output streams to the presentation device 102A for presentation to the user. In some embodiments, the entertainment device 104A includes control logic configured to receive delay constant information from the first presentation device 102A. In other words, the presentation device 102A provides the entertainment device 104A with its known delay constant for further processing. The entertainment device 104A contains control logic configured to process timing information received from the sensing device 106, presentation device 102A, or presentation device 102C and identify a delay constant based on the timing information. The delay constant is used by the entertainment device 104A to synchronize the output of an audio signal to the presentation device 102B and video signal to the presentation device 102A so as to ensure that they are perceived as in sync by the user. In at least one embodiment, the entertainment device 104A includes control logic operable to use the delay constant to control 3-D active shutter glasses and to synchronize the operation of the 3-D active shutter glasses with its output of 3-D content to the presentation device 102A (e.g., a 3-D TV).

Figure 3:
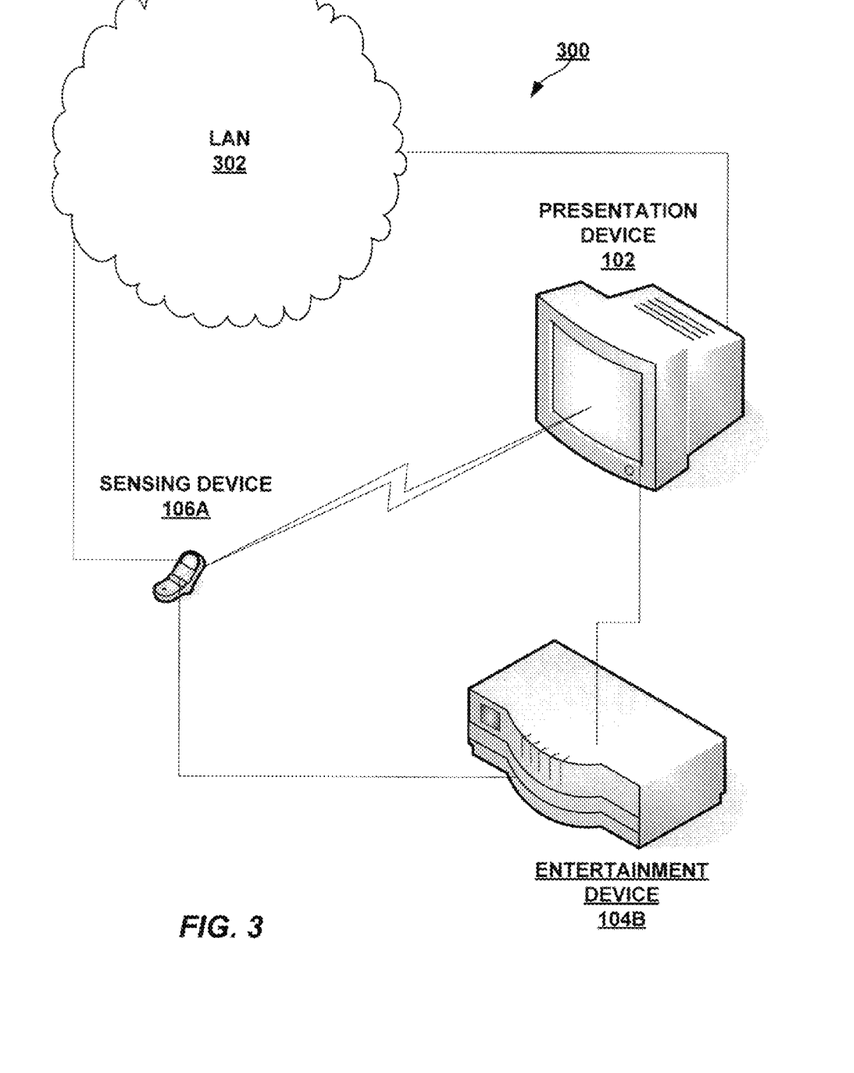
FIG. 3 illustrates another embodiment of an entertainment system.

FIG. 3 illustrates another embodiment of an entertainment system 300. FIG. 3 will be discussed in reference to the entertainment system 100 illustrated in FIG. 1. The entertainment system 300 includes a presentation device 102, an entertainment device 104B, a sensing device 106A, and a local area network (LAN) 302. Each of these components is discussed in greater detail below. The entertainment system 300 may contain other components, elements, or devices not illustrated for the sake of brevity.

The sensing device 106A may comprise any system or apparatus configured to sense light and/or video displayed by a presentation device 102. The sensing device 106A is communicatively coupled to the entertainment device 104B via any wired or wireless communication link. The sensing device 106A is also communicatively coupled to the LAN 302 via any wired or wireless communication link. In at least one embodiment, the sensing device 106A includes a light sensor and color filter operable to detect a specific color contained in a video test pattern generated by the entertainment device 104B and displayed by the presentation device 102. In some embodiments, the sensing device 106A is a mobile communication device (e.g., a cellular phone) or a pair of 3-D glasses. The sensing device 106A may comprise a personal digital assistant, tablet computer, laptop computer or the like. In at least one embodiment, the sensing device 106A is operable to communicate with the presentation device 102 via the LAN 302 using text messages, control signals, various internet protocols, voice commands, or the like.

The LAN 302 may comprise any local communication network, utilizing any desired network topology (or topologies when multiple mediums are utilized). In at least one embodiment, the LAN 302 comprises a wired or wireless router. In some embodiments, the LAN 302 is an Ethernet network, Wi-Fi network, Bluetooth network, or the like. The LAN 302 is communicatively coupled to the presentation device 102 and the sensing device 106A.

In at least one embodiment, the entertainment device 104B may be similar to the entertainment device of FIG. 1. Additionally, entertainment device 104B is communicatively coupled to the sensing device 106A via any wired or wireless communication link. In at least one embodiment, the entertainment device 104B is operable to communicate with the sensing device 106A via a mobile communication network (e.g., a cellular telephone network). Entertainment device 104B may be operable to communicate with the LAN 302 via the sensing device 106A. In some embodiments, the entertainment device 104B includes control logic configured to process timing information and/or control signals received from the sensing device 106A.

Figure 4:
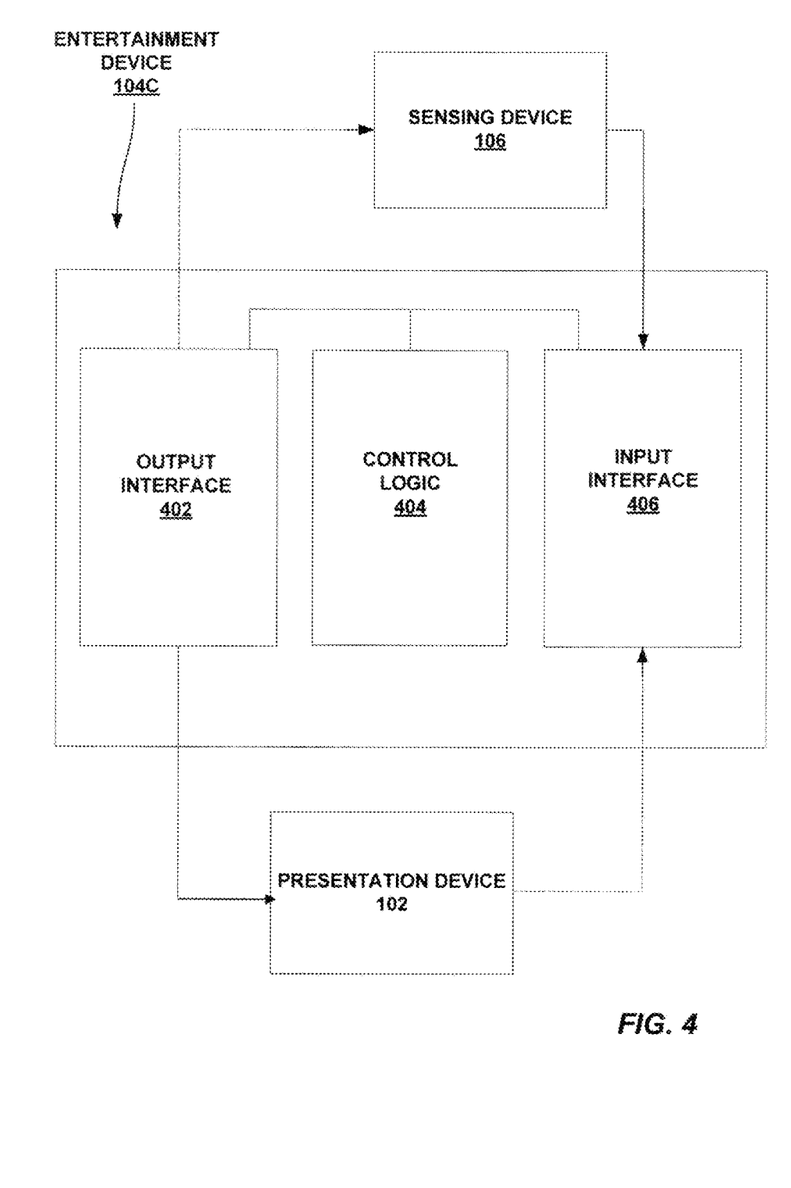
FIG. 4 illustrates an embodiment of the entertainment device of FIG. 1.

FIG. 4 illustrates an embodiment of the entertainment device of FIG. 1. The entertainment device 104C will be described in reference to the entertainment system of FIG. 1. The entertainment device 104C includes an output interface 402 communicatively coupled to the presentation device 102, control logic 404, and an input interface 406 communicatively coupled to the sensing device 106. The output interface 402 may also be communicatively coupled to the sensing device 106, and the input interface 406 may be communicatively coupled to the presentation device 102. Each of these components is discussed in greater detail below. The entertainment device 104C may contain other components, elements, or devices not illustrated for the sake of brevity.

The entertainment device 104C contains an output interface 402 operable to output audio and/or video data to at least one presentation device 102. In at least one embodiment, the output interface 402 is operable to output a video test pattern to the presentation device 102. In some embodiments, the output interface 402 may include multiple output connections operable to transmit data to the presentation device 102 in multiple formats through multiple communication mediums. For example, the output interface 402 may include a modulator operable to modulate data onto an NTSC channel for transmission to the presentation device 102 through a coaxial cable. In other embodiments, the output interface 402 may include composite or component outputs which communicatively couple to similar outputs of the presentation device 102 through appropriate cabling. In at least one embodiment, the output interface 402 comprises a High Definition Multimedia Interface (HDMI) that outputs high definition content to the presentation device 102. As shown in FIG. 4, in at least one embodiment the output interface 402 is communicatively coupled to the control logic 404 and input interface 406 (e.g., by using a bus).

In at least one embodiment, the output interface 402 bi-directionally communicates with the presentation device 102. For example, an HDMI port is capable of bi-directionally communicating with the presentation device 102. A Consumer Electronics Control (CEC) connection may be utilized to allow the entertainment device 104C to control the presentation device 102 or to facilitate user control over the entertainment device 104C and presentation device 102. The output interface 402 and CEC may also exchange various types of data with the presentation device 102 over the bi-directional communication link. For example, the presentation device 102 and entertainment device 104C may exchange information identifying themselves, their capabilities, and/or a delay constant using the output interface 402. Other bi-directional communication links, such as Ethernet, WiFi, IEEE 1394, USB and the like are also possible in accordance with various embodiments.

The entertainment device 104C's control logic 404 is operable for controlling the operation of the entertainment device 104C. The control logic 404 manages the actions, input, and output of the entertainment device 104C. The control logic 404 is communicatively coupled to the output interface 402 and input interface 406. In at least one embodiment, the control logic 404 is communicatively connected to the output interface 402 and input interface 406 (e.g., by using a bus). In some embodiments, the control logic 404 is configured to identify a delay constant based on timing information received from the sensing device 106 via the input interface 406. The delay constant is used to synchronize the output of the audio and video signals via the output interface 402 to the presentation device 102, ensuring that the user perceives the audio and video signals as in sync. If the entertainment device 104C comprises any type of video gaming system or any other system (e.g., a set-top box or personal computer) that is capable of playing video games, then the control logic 404 is operable to utilize the delay constant so as to synchronize all interactivity between the user, the gaming peripherals, the video game, and the entertainment device 104C with the audio and video output as presented by the presentation device 102. Likewise, if the entertainment device 104C comprises a set-top box or like device that is capable of outputting 3-D content and driving corresponding 3-D shutter glasses, then the control logic 404 is operable to utilize the delay constant to synchronize the audio and 3-D video output to be displayed by the presentation device 102 with the operation of the 3-D active shutter glasses. In at least one embodiment, the control logic 404 is configured to receive a delay constant from the presentation device 102 via the input interface 406 and use the delay constant to synchronize the output of the audio and video signals via the output interface 402 to the presentation device 102. In some embodiments, the control logic 404 is operable to receive and process control signals from the sensing device 106 and/or the presentation device 102. The control logic 404 may also be operable to generate and output control signals to the sensing device 106.

The input interface 406 is operable for receiving presentation content, e.g., audio and video content. The input interface 406 may also be operable for receiving and tuning any type of video content. For example, the input interface 406 may receive an over-the-air broadcast signal, a direct broadcast satellite signal or a cable television signal. In at least one embodiment, the input interface 406 may receive or retrieve content from a storage medium, such as an optical disk, internal or external hard drive, a portable storage device (e.g., universal serial bus (USB) memory sticks) and the like. The input interface 406 may also receive content from external servers, such as video servers, that are communicatively coupled to the entertainment device 104C over the internet or other types of data networks.

In at least one embodiment, the input interface 406 is operable to wirelessly receive data from a remote control, sensing device 106, video gaming peripheral, or other input device such as a keyboard, mouse, mobile communication device or the like. The input interface 406 may communicate with the sensing device 106 utilizing any wired or wireless communication link. The input interface 406 may receive various types of data from the presentation device 102 over a bi-directional communication link. For example, the presentation device 102 may transmit information identifying itself, information identifying its capabilities, a control signal, and/or a delay constant to the input interface 402, and the input interface may transmit control signals to the presentation device 102.

Figure 5:
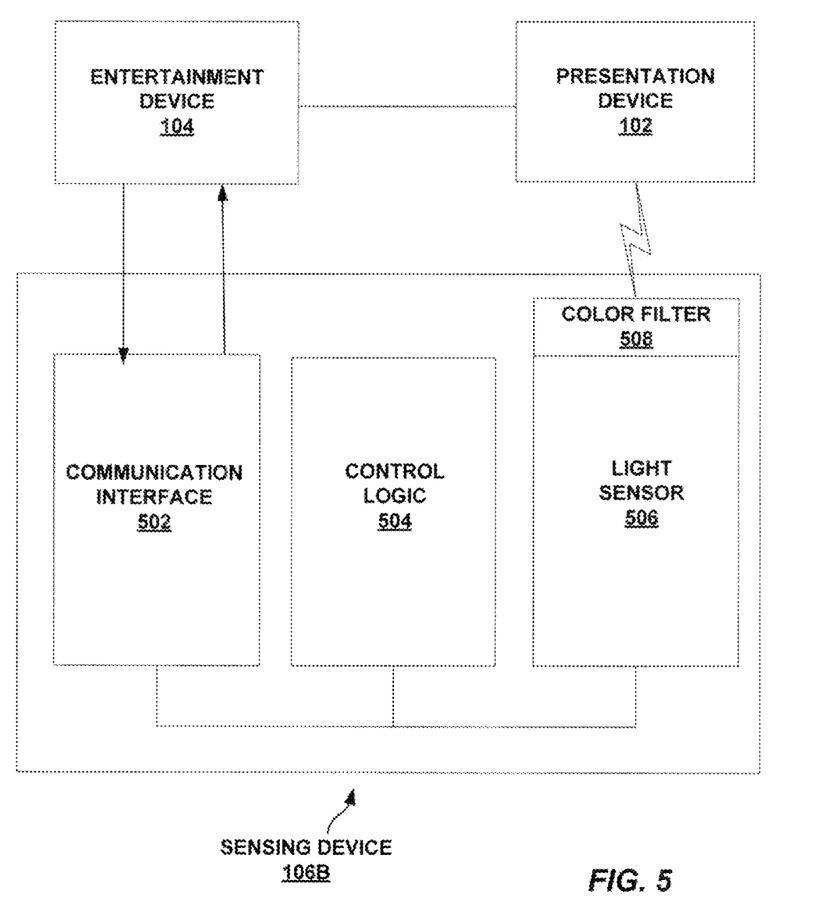
FIG. 5 illustrates an embodiment of the sensing device of FIG. 1.

FIG. 5 illustrates an embodiment of the sensing device of FIG. 1. The sensing device 106B will be described in reference to the entertainment system of FIG. 1. The sensing device 106B includes a communication interface 502 communicatively coupled to the entertainment device 104, control logic 504, a light sensor 506, and a color filter 508. Each of these components is discussed in greater detail below. The sensing device 106B may contain other components, elements, or devices not illustrated for the sake of brevity.

The communication interface 502 communicatively couples to the entertainment device 104 and is operable to input and output data. The communication interface 504 may include any type of network interface, such as a WiFi transceiver, Ethernet interface, or the like. In at least one embodiment, the communication interface 502 is operable to communicate with the LAN 302 of FIG. 3. In some embodiments, the communication interface 502 is operable to communicate via a mobile communication network (e.g., a cellular telephone network), IR and/or RF interface, or the like. The communication interface 502 is communicatively coupled to the control logic 504. In at least one embodiment, the communication interface is communicatively coupled to the control logic 504 and the light sensor 506 (e.g., by using a bus).

The communication interface 502 may receive queries or instructions from the entertainment device 104 and/or transmit messages or data to the entertainment device 104 responsive to a command from the control logic 504. The communication interface 502 is operable to transmit video timing information, control signals, and/or other data to the entertainment device 104. In at least one embodiment, the communication interface 502 is also operable to send and receive interactive video game information and/or control signals to and from the presentation device 102 and/or the entertainment device 104.

The sensing device 106B includes control logic 504 operable for controlling its operation. The control logic 504 manages the actions, input, and output of the sensing device 106B. The control logic 504 is communicatively coupled to the communication interface 502 and light sensor 506. In at least one embodiment, the control logic 504 is communicatively coupled to the communication interface 502 and light sensor 506 (e.g., by using a bus). In at least one embodiment, the control logic 504 is configured to receive video test pattern data output by the presentation device 102 and sensed by the light sensor 506, convert the data into video timing information, and transmit the video timing information to the entertainment device 104 via the communication interface 502. The control logic 504 may be operable to receive delay information pertaining to a specific presentation device 102 from the entertainment device 104 via the communication interface 502. In some embodiments, the control logic 504 is programmed to receive video test pattern data output by the presentation device 102 and sensed by the light sensor 506, determine a delay constant based on the data, and output the delay constant to the entertainment device 104 via the communication interface 502. In other embodiments, the control logic 504 may also be operable to analyze video information received by the light sensor 506 and derive a delay constant tied to a specific presentation device 102.

The sensing device 106B includes a light sensor 506 communicatively coupled to the control logic 504, color filter 508, and communication interface 502. In at least one embodiment, the light sensor 506 is communicatively coupled to the communication interface 502 and control logic 504 (e.g., by using a bus). The light sensor 506 is operable to detect light and/or video data output by the presentation device 102. In at least one embodiment, the light sensor 506 works in conjunction with the color filter 508 to recognize a specific color of a video test pattern. The exact time the specific color appears on the video test pattern and is detected by the light sensor 506 is recorded by the control logic 504 and used to determine video timing information and/or a delay constant to be transmitted to the entertainment device 104 via the communication interface 502.

In at least one embodiment, the color filter 508 is operable to filter light so as to allow a specific color to penetrate the filter. The color filter 508 is connected to the light sensor 506. The color filter permits a predetermined color to be detected by the light sensor 506 and is operable to prevent interference by other light sources. The predetermined color is known by the entertainment device 104, incorporated into the video test pattern, generated by the entertainment device 104, and displayed by the presentation device 102.

Figure 6:
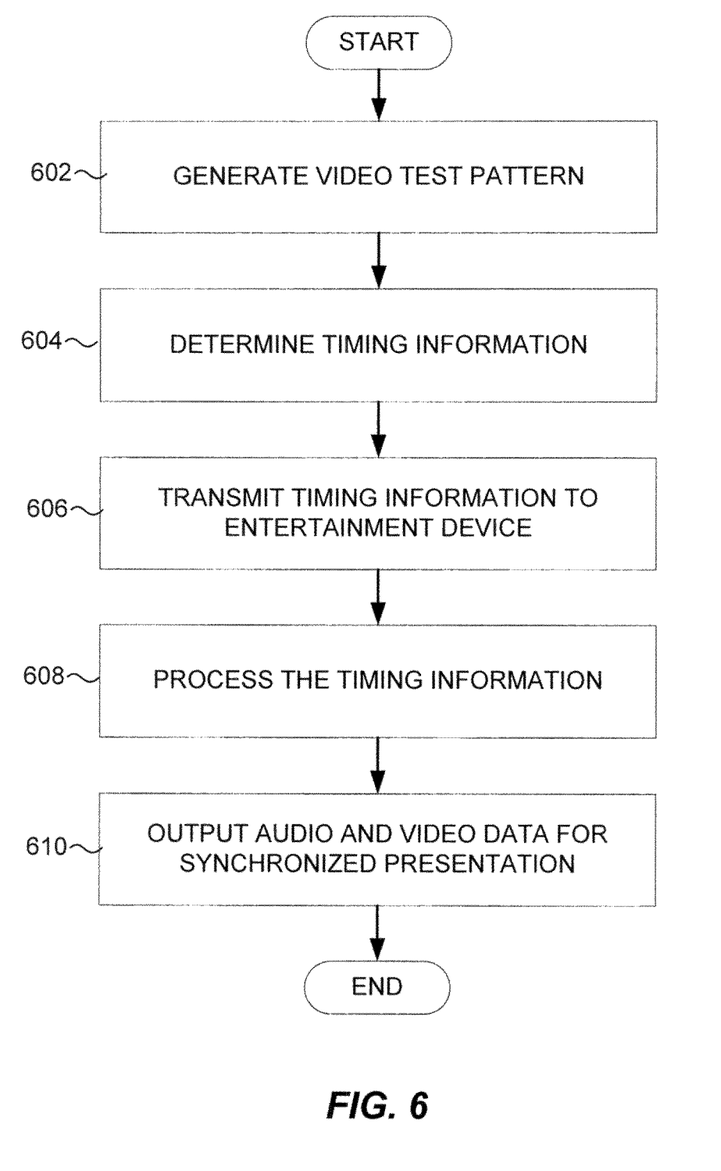
FIG. 6 illustrates an embodiment of a process for automatically synchronizing audio and video signals.

FIG. 6 illustrates an embodiment of a process for synchronizing audio and video signals. The process of FIG. 6 will be described in reference to the entertainment system of FIGS. 1, 4, and 5. The process of FIG. 6 may include other operations not illustrated for the sake of brevity.

The process includes generating a video test pattern for transmission to a presentation device 102 (operation 602). The test pattern may be generated by the entertainment device 104 or provided by other external devices. The test pattern may be constant or variable, and may be stored in entertainment device 104 memory. Generating the test pattern may be automatic or may be responsive to user input or other triggering events. For example, the entertainment device 104 may automatically generate the test pattern when connected to a presentation device 102 for the first time. In another embodiment, the test pattern may be generated when instructed to do so by the user via the sensing device 106 or other external control.

The process further includes utilizing a sensing device 106 to determine timing information based on the video test pattern (operation 604). The timing information may be determined by the internal control logic of the sensing device 106 or by the control logic of the entertainment device 104. In at least one embodiment, the timing information is determined by comparing the exact moment that the sensing device 106 senses a predetermined image or signal (e.g., a specific color matched to a color filter) of the video test pattern with the moment the variable is known to have been output by the entertainment device 104. For example, the entertainment device 104 may output a video test pattern at a specific time (e.g., time zero). Internal logic of the sensing device 106 or entertainment device 104 is configured to recognize that the predetermined image or signal should be output by the presentation device 102, assuming no delay, at a specific time (e.g., time five). When the sensing device 106 senses the variable at a later time (e.g., time eight), then the sensing device 106 or entertainment device 104 control logic records the difference (e.g., a value of three). The time difference may be recorded and/or transmitted as any form of data.

In another embodiment of operation 604, the sensing device 106 is in sync with the entertainment device. The sensing device 106 senses a predetermined image or signal and issues a time stamp recording the exact moment the image or signal was recognized: The time stamp comprises the timing information, and is later used by the entertainment device 104 or sensing device 106 to determine a delay constant.

The process of FIG. 6 further includes transmitting the timing information determined in operation 604 to the entertainment device 104 (operation 606). The sensing device 106 is communicatively coupled to the entertainment device 104 over any wired or wireless connection (e.g., USB connection, LAN, infrared interface, or the like). The timing information may be data in any form. In at least one embodiment, the timing information is transferred over a mobile communication network (e.g., a cellular telephone network). In another embodiment, the timing information is transferred over the internet. In yet another embodiment, the timing information is transferred using infrared or radio signals. The timing information is output by the sensing device 106 via its communication interface and received by the input interface of the entertainment device 104.

The next operation in the process is the processing of the timing information (operation 608). The control logic of the entertainment device 104 is operable to process the timing information so as to create a delay constant. In at least one embodiment, the timing information is received as a time difference. The control logic of the entertainment device 104 uses the value of the difference along with the known delay caused by audio and video cables connected to the presentation device 102 and the known delay of audio output in order to calculate a delay constant. The delay constant is stored in the non-volatile memory associated with the entertainment device's 104 control logic and paired with a particular presentation device 102.

In another embodiment of operation 608, the timing information is received by the entertainment device 104 as a time stamp. The time stamp information is compared to the time that the entertainment device output the video test signal. The difference in time is modified, if necessary, to account for any excess delay created by the sensing device 106, and the resulting delay constant is created and stored in non-volatile memory. In some embodiments, the delay constant for a specific presentation device 104 is stored in a table, the table recording the delay constants for a plurality of unique presentation devices.

In yet another embodiment of operation 608, the timing information is received by the entertainment device 104 as a time stamp, time difference and/or event notification. The timing information is processed as described above to determine a delay constant. The delay constant is used by the entertainment device 104 to synchronize the operation of 3-D active shutter glasses with the output of 3-D content to the presentation device 102, ensuring that the 3-D or stereoscopic images appear correctly to the user when viewed through the 3-D glasses.

The final operation in the process is the output of audio and video data by the entertainment device 104 for synchronized presentation by the presentation device 102 (operation 610). The control logic 404 of the entertainment device uses the appropriate delay constant to synchronize the audio and video output signals. In at least one embodiment, the output of the video signal is delayed by the value of the delay constant in relation to the output of the audio signal. In another embodiment, the output of the audio signal is delayed by the value of the delay constant in relation to the output of the video signal. In some embodiments, the outputs of both the audio and video signals are delayed by the value of the delay constant in relation to the output of video game information by the entertainment device 104. The output of the video may be delayed by the value of the delay constant in relation to the operation of 3-D active shutter glasses paired with the presentation device 102. The audio and video signals are transmitted to the presentation device 102. When displayed by the presentation device 102 the audio and video outputs are synchronized and the viewer or video game player perceives no lag, and any 3-D content is displayed correctly when viewed through 3-D glasses.

Although specific embodiments were described herein, the scope of the invention is not limited to those specific embodiments. The scope of the invention is defined by the following claims and any equivalents therein.

What is claimed is:

1. A method for sychronizaing audio and video signal, the method comprising:
generating a video test pattern in an entertainment device for display by a presentation device;
automatically determining timing information of the video test pattern by capturing the video test pattern using a light sensor and color filter of a sensing device that comprises a mobile communication device, wherein the timing information includes:
a time difference, and
a time stamp;
transmitting the timing information from the sensing device to the entertainment device; and
processing the timing information at the entertainment device to synchronize audio data output by the entertainment device with video data output by the entertainment device for display by the presentation device.

2. The method of claim 1, wherein the presentation device includes at least one audio output to an audio presentation device and at least one separate video output to a video presentation device.

3. The method of claim 1, wherein generating the video test pattern further comprises alternating different colored screens, of which at least one color screen matches the color filter utilized by the sensing device.

4. The method of claim 1, wherein the entertainment device comprises an external television receiver.

5. The method of claim 1, wherein the entertainment device is communicatively coupled to the sensing device via a wireless communication link.

6. A sensing device, comprising:
a light sensor, that comprises a color filter, operable to capture a test pattern presented by a presentation device, the presentation device receiving the test pattern from a communicatively coupled entertainment device;
a communication interface communicatively coupled to the entertainment device;
control logic operable to analyze the captured test pattern to automatically generate timing information associated with the test pattern and initiate transmission of the timing information to the entertainment device via the communication interface, wherein: the timing information includes:
a time difference, and
a time stamp; and
wherein the sensing device comprises a mobile communication device and the timing information may be utilized by the entertainment device to synchronize audio and video output to at least one presentation device.

7. The sensing device of claim 6, wherein the color filter is matched to at least one color displayed in the video test pattern.

8. An entertainment device, comprising:
an output interface communicatively coupled to at least one presentation device and operable to output at least a video test pattern to the at least one presentation device;
an input interface communicatively coupled to a sensing device comprising a mobile communication device and operable to at least receive timing information associated with the video test pattern presented by the presentation device,
wherein the timing information includes:
a time difference, and
a time stamp; and
control logic operable to identify a delay constant based on the timing information and process the delay constant to offset output of at least one of audio and video data to the presentation device, to synchronize the at least one of audio and video data output by the output interface and presented by the presentation device.

9. The entertainment device of claim 8, further comprising a communication interface operable to receive television programming via a television distribution network.

10. The entertainment device of claim 8, wherein the control logic is operable to synchronize the output of the audio and video data to the presentation device based on a delay constant output by the presentation device and received by the entertainment device via the input interface.

11. The entertainment device of claim 8, further comprising a communication interface that is communicatively coupled to the mobile communication device via a wireless communication network and operable to receive the timing information from the mobile communication device.

* * * * *

UNITED STATES PATENT AND TRADEMARK OFFICE
CERTIFICATE OF CORRECTION

PATENT NO. : 8,665,320 B2  
APPLICATION NO. : 12/843370  
DATED : March 4, 2014  
INVENTOR(S) : Eric Holley Page 1 of 1

It is certified that error appears in the above-identified patent and that said Letters Patent is hereby corrected as shown below:

Title Page: Item (73) In the Assignee:

Please delete the space between 'Echo' and 'Star'. The correct Assignee shall be "EchoStar Technologies L.L.C."

In the Claims:

In Claim 1:

Please delete:

"A method for synchronizaing audio and video signal"

And replace with:

"A method for synchronizing audio and video signal"

Signed and Sealed this  
Twenty-seventh Day of May, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,665,320 B2  Page 1 of 1
APPLICATION NO. : 12/843370
DATED : March 4, 2014
INVENTOR(S) : Eric Holley It is certified that error appears in the above-identified patent and that said Letters Patent is hereby corrected as shown below:

Title Page: Item (73) In the Assignee:

Please delete the space between 'Echo' and 'Star'. The correct Assignee shall be "EchoStar Technologies L.L.C."

In the Claims:

Col. 11, line 66,

In Claim 1:

Please delete:

"A method for synchronizaing audio and video signal"

And replace with:

"A method for synchronizing audio and video signal"

This certificate supersedes the Certificate of Correction issued May 27, 2014.

Signed and Sealed this
First Day of July, 2014

Michelle K. Lee
*Deputy Director of the United States Patent and Trademark Office*